United States Patent
Chidester

(10) Patent No.: US 8,098,017 B2
(45) Date of Patent: Jan. 17, 2012

(54) AUTOMATIC, LOW LEVEL FLOOR LIGHTING SYSTEM

(76) Inventor: Daniel William Chidester, Beaver Falls, PA (US)

( * ) Notice: Subject to any disclaimer, the term of this patent is extended or adjusted under 35 U.S.C. 154(b) by 429 days.

(21) Appl. No.: 12/358,196

(22) Filed: Jan. 22, 2009

(65) Prior Publication Data
US 2010/0181934 A1 Jul. 22, 2010

(51) Int. Cl.
*H05B 37/02* (2006.01)
(52) U.S. Cl. .................. 315/149; 315/291; 315/152
(58) Field of Classification Search .............. 315/149, 315/152, 156–159, 194, 362, 291
See application file for complete search history.

(56) References Cited

U.S. PATENT DOCUMENTS

| | | | |
|---|---|---|---|
| 5,763,872 A | 6/1998 | Ness | |
| 6,013,985 A * | 1/2000 | Green et al. | 315/149 |
| 6,340,864 B1 * | 1/2002 | Wacyk | 315/158 |
| 6,415,245 B2 * | 7/2002 | Williams et al. | 702/188 |
| 6,573,659 B2 * | 6/2003 | Toma et al. | 315/149 |
| 6,894,434 B1 * | 5/2005 | Kosoff | 315/134 |
| 7,355,523 B2 * | 4/2008 | Sid | 340/9.16 |
| 7,521,872 B2 * | 4/2009 | Bruning | 315/158 |

\* cited by examiner

*Primary Examiner* — Don Le
(74) *Attorney, Agent, or Firm* — Paul S. Chirgott

(57) ABSTRACT

An automatic, low level floor lighting system includes a light unit including a light operable to produce visible light when energized by a power source and a control means for allowing a user to adjust an intensity of the visible light. The light unit also includes an ambient light sensor to inhibit the light from being energized when an ambient light is above a predetermined level. The light unit further includes a receiver for receiving an activation signal to energize the light and a deactivation signal to de-energize the light. A transmitter transmits the activation and deactivation signals to an additional light unit. The system also includes a remote activation unit for transmitting the activation and deactivation signals to the receiver when the user engages the remote activation unit where the user can remotely turn the light on and off when the ambient light is below the predetermined level.

20 Claims, 3 Drawing Sheets

AUTOMATIC, LOW LEVEL FLOOR LIGHTING SYSTEM

FEDERALLY SPONSORED RESEARCH OR DEVELOPMENT

Not applicable.

REFERENCE TO SEQUENCE LISTING, A TABLE, OR A COMPUTER LISTING APPENDIX

Not applicable.

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates generally to lighting. More particularly, the invention relates to automatic, low level floor lighting.

BACKGROUND OF THE INVENTION

Low level floor lighting is relatively soft lighting that illuminates the floor and may be used to enable a person to navigate the interior of a building without getting hurt or turning on bright lights that may temporarily blind the person in darkness or disturb others who are sleeping. Many situations may arise in the home where there is a need for low level lighting for example, without limitation, to find the bathroom during the night or when exiting a building in an emergency. Currently known low level lighting devices for these purposes include nightlights. However, nightlights are typically single devices that illuminate a portion of a room rather than lighting a path through the building.

It is preferable that this lighting can be easily turned on by the user only when the lighting is needed. Currently known low level lighting may be turned on by various means. For example, without limitation, one method is a switch that may be mounted on the wall or on the light itself. However, this method may require the user to cross the room and search for the switch in the dark. Another method is a motion detector that turns on the light when motion is detected near the light. However, motion detectors may occasionally detect motion and turn on the light when the light is not needed. Yet another currently known method for turning on low level lighting is a light sensor that turns on the light when the room reaches a predetermined level of darkness. However, this method requires the light to be constantly on when the room is dark. Some known devices may use a combination of these methods.

One prior art example of low level lighting is a motion actuated nightlight. This particular nightlight device provides a low level illumination using electro-phosphorescent lighting, which is automatically turned on when motion near the device is detected by the device and if the ambient lighting level is low. When the ambient light level is above a specified level so that it is possible to see without a nightlight, the device is inactive. A high intensity lighting feature allows the device to be used as a flashlight in emergencies since the device is fastened to a wall in such a way that it is easily and quickly removed. The front face of the device provides a downwardly directed surface for projecting light toward the floor and sideways directed surfaces for projecting light to each side. Spherical Fresnel lenses enable the device to detect motion over a 180-degree azimuth. The device may have phosphorescent doping within its case structure so as to provide a dim light even when not energized. This device is basically a flashlight that is wall mounted and turned on via a motion detector.

Other known devices use motion detectors to light pathways outside of the home rather than in the interior of the house. Another known low level lighting device is emergency floor lighting for commercial vehicles such as but not limited to airplanes. However, this lighting is not controlled by the user.

In view of the foregoing, there is a need for improved techniques for lighting pathways with a single light or series of lights inside a building that are activated by the user when the lighting is needed.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a front view, and FIG. 1B is a cross sectional side view;

Figure 1A:
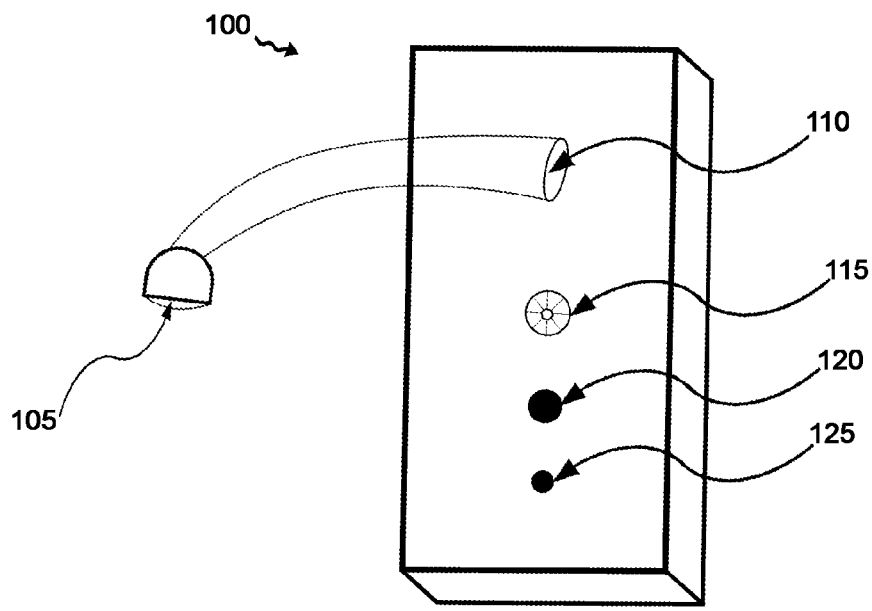
FIGS. 1A and 1B illustrate an exemplary light unit from an automatic low level lighting system, in accordance with an embodiment of the present invention.

Unless otherwise indicated illustrations in the figures are not necessarily drawn to scale.

SUMMARY OF THE INVENTION

To achieve the forgoing and other objects and in accordance with the purpose of the invention, an automatic, low level floor lighting system is presented.

In one embodiment, an automatic, low level floor lighting system is presented. The system includes a light unit including a light operable to produce visible light when energized by a power source, a connection to the power source and a control means for allowing a user to adjust an intensity of the visible light. The light unit also includes an ambient light sensor for inhibiting the light from being energized when an ambient light is above a predetermined level. The light unit further includes a receiver for receiving an activation signal for energizing the light and a deactivation signal for de-energizing the light and a transmitter for transmitting the activation signal and the deactivation signal to an additional light unit. The system also includes a remote activation unit for transmitting the activation signal and the deactivation signal to the receiver when the user engages the remote activation unit where the user can remotely turn the light on and off when the ambient light is below the predetermined level. In other embodiments the remote activation unit further includes a pressure switch where the user engages the pressure switch using a foot and the pressure switch is contained within a throw rug. In another embodiment the remote activation unit is contained within a hand held device and includes a button, which the user engages. Another embodiment further includes a plurality of light units where when at least one of the light units receives the activation signal from the remote activation unit, the activation signal is passed between the light units such that all of the light units receive the activation signal. In yet other embodiments the light unit further includes a flexible tube having a distal end joined to the light where, by bending the flexible tube, a direction of a beam of the visible light can be changed and a shroud to illuminate a path on the floor and block visible light not directed at the floor. In another embodiment the receiver, transmitter and remote activation unit communicate using wireless communication waves; e.g., without limitation, infrared, radio, ultrasonic, etc. In still another embodiment the connector further includes prongs that fit a standard wall outlet. Yet another embodiment further includes a smoke detector including an additional remote activation unit for transmitting the activation signal when the smoke detector issues an alarm.

In another embodiment an automatic, low level floor lighting system is presented. The system includes a light unit including means for producing visible light, means for connecting to a power source, means for controlling an intensity of the visible light, means for inhibiting the producing means when an ambient light is above a predetermined level, means for receiving an activation signal to activate the producing means and a deactivation signal for deactivating the producing means and means for transmitting the activation signal and the deactivation signal to an additional light unit. The system also includes means for remotely transmitting the activation signal and the deactivation signal to the receiving means where the producing means can be turned on and off when the ambient light is below the predetermined level. Other embodiments further include means for changing a direction of a beam of the visible light and means for illuminating a path on the floor and blocking visible light not directed at the floor. Yet another embodiment further includes means for transmitting the activation signal when smoke is detected.

In another embodiment an automatic, low level floor lighting system is presented. The system includes a plurality of light units each including a light operable to produce visible light when energized by a power source and a connection to the power source. A control means for allows a user to adjust an intensity of the visible light. An ambient light sensor inhibits the light from being energized when an ambient light is above a predetermined level. A receiver receives an activation signal for energizing the light and a deactivation signal for de-energizing the light. A transmitter transmits the activation signal and the deactivation signal to at least one other light unit where the user can remotely send the activation signal and the deactivation signal to turn the light on and off in all of the plurality of light units when the ambient light is below the predetermined level. In another embodiment at least one of the light units further includes a flexible tube having a distal end joined to the light where, by bending the flexible tube, a direction of a beam of the visible light can be changed. In yet another embodiment at least one of the light units further includes a shroud to illuminate a path on the floor and block visible light not directed at the floor. In another embodiment the receivers and transmitters communicate using wireless communication waves. In still another embodiment the connectors further includes prongs that fit a standard wall outlet. Yet another embodiment further includes a smoke detector having a remote activation unit for transmitting the activation signal when the smoke detector issues an alarm. It should be appreciated that, in the present embodiment, when the smoke detector activates the light, they will illuminate regardless of ambient lighting.

Other features, advantages, and object of the present invention will become more apparent and be more readily understood from the following detailed description, which should be read in conjunction with the accompanying drawings.

DETAILED DESCRIPTION OF THE PREFERRED EMBODIMENTS

The present invention is best understood by reference to the detailed figures and description set forth herein.

Embodiments of the invention are discussed below with reference to the Figures. However, those skilled in the art will readily appreciate that the detailed description given herein with respect to these figures is for explanatory purposes as the invention extends beyond these limited embodiments. For example, it should be appreciated that those skilled in the art will, in light of the teachings of the present invention, recognize a multiplicity of alternate and suitable approaches, depending upon the needs of the particular application, to implement the functionality of any given detail described herein, beyond the particular implementation choices in the following embodiments described and shown. That is, there are numerous modifications and variations of the invention that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention will now be described in detail with reference to embodiments thereof as illustrated in the accompanying drawings.

A preferred embodiment of the present invention provides a system that enables a user to automatically turn on low level floor lights. Preferred embodiments enable a person to navigate the interior of a building with less chance of injury and without turning on bright lights that may temporarily blind the person in darkness. Preferred embodiments illuminate the floor via a light or a series of lights that are either plugged into electrical outlets or hard wired into walls. These lights can be arranged to show a path to a desired destination. In preferred embodiments the lights are activated via a sensor for example, without limitation, a pressure switch, motion detector, electronic switch, or a remote control. The lights in preferred embodiments have a moveable head that enables light to be cast onto the floor even around furniture that may be obscuring the electrical outlet into which the light is plugged.

Preferred embodiments of the present invention comprise two basic components, a switch unit and one or more light units. The switch unit in preferred embodiments is a pressure switch that sends a signal to all of the light units to which the switch is connected simultaneously. However, alternate embodiments may use various different types of switches. The power source of the switch unit is preferably a battery; however, alternate power sources may also be used such as, but not limited to, a power cord plugged into a wall outlet, solar cells, etc. The light unit in preferred embodiments is a light that is plugged into a standard outlet with an optional battery backup power in case of loss of electricity with audible warning when battery is power is low; the physical light is attached to a flexible tube that connects to the main housing of the light unit, which is plugged into the outlet. Two subcomponents of preferred embodiments are a rheostat to control light intensity and a photocell to inhibit operation during daylight hours.

Figure 1B:
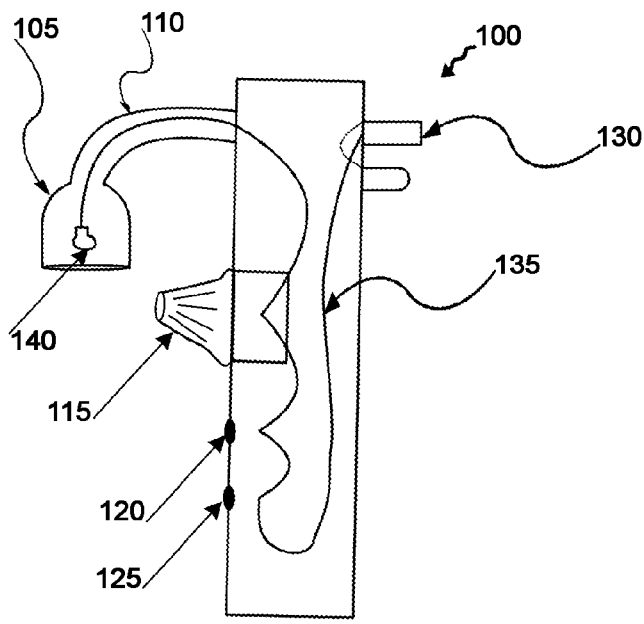

FIGS. 1A and 1B illustrate an exemplary light unit 100 from an automatic low level lighting system, in accordance with an embodiment of the present invention. FIG. 1A is a front view, and FIG. 1B is a cross sectional side view. In the present embodiment, light unit 100 is made of a rigid material such as, but not limited to, plastic. The front of light unit 100 comprises a light 105 on a flexible tube 110, a rheostat 115, a photocell 120, and a receiver/transmitter 125 and an optional battery backup power with audible warning when battery power is low. module. Flexible tube 110 enables the user to adjust the direction in which the light from light 105 is cast, for example, without limitation, on the floor. Flexible tube 110 is preferably made of plastic; however, the flexible tube in alternate embodiments may be made of various other materials such as, but not limited to, rubber, metal, etc. Alternate embodiments may use various different means for enabling the direction of the light to be adjustable such as, but not limited to, pivoting lights, and in yet other alternate embodiments, the direction of the light may not be adjustable. In the present embodiment, the back of light unit 100 comprises a plug 130 with three metal prongs to fit into a standard 110 v wall outlet. On the inside of light unit 100 wiring 135 connects the prongs of plug 130 to receiver/transmitter 125, then wiring 135 continues to photocell 120, then to rheostat 115. Wiring 135 then goes through flexible tube 110 to a light bulb 140 in light 105. Receiver/transmitter 125 controls the on/off function of light unit 100 and, in some embodiments, may also send signals to the next light unit in the lighting system if multiple light units are used. Photocell 120 disables light unit 100 when the light in the room exceeds a predetermined level of brightness. This generally prevents light unit 100 from working during daylight hours or when other lights are on in the room. Rheostat 115 enables the user to control the intensity of light 105. In the present embodiment, light 105 has adjustable intensity and adjustable variance of light from spotlight to flood light. However, alternate embodiments may have different light intensity variances or may not have adjustable light intensity. In some embodiments, light 105 may be shrouded to illuminate the floor and block light not directed at the floor. These embodiments may be useful for users such as, but not limited to, nursing mothers and children being potty trained. In an exemplary embodiment the height of lighting unit 100 is 3 inches, the width is 1.5 inches and the depth is 0.75 inches. However, those skilled in the art, in light of the present teachings, will readily recognize that light units may be made in a wide variety of sizes.

Figure 2:
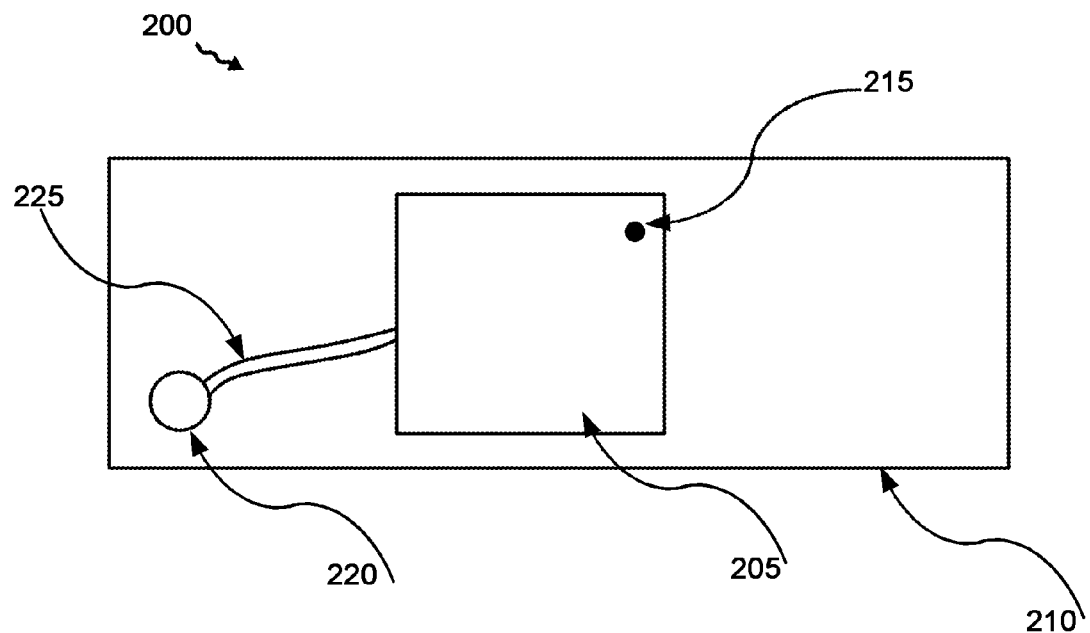
FIG. 2 illustrates an exemplary switch unit from an automatic low level lighting system, in accordance with an embodiment of the present invention.

FIG. 2 illustrates an exemplary switch unit 200 from an automatic low level lighting system, in accordance with an embodiment of the present invention. In the present embodiment switch unit 200 comprises a pressure switch 205 integrated into a throw rug 210. Pressure switch 205 uses wireless communication waves infrared waves emitted from a transmitter 215 to transmit signal to a light unit or a series of light units. Alternate embodiments may use other means for transmitting the signal from the switch unit to the light units such as, but not limited to wires that connect all of the units. In the present embodiment, the power source for switch unit 200 is a battery 220 that is connected by a wire 225 to pressure switch 205; however, alternate embodiments may be powered by various different means for example, without limitation, being plugged into a wall outlet.

In an exemplary use of the present embodiment, throw rug 210 comprising pressure switch 205 is on the floor next to a person's bed. When the person gets out of bed, they step on pressure switch 205, which transmits a signal to a series of light units leading the person to a destination for example, without limitation, the bathroom, a children's room, an exit, etc. The signal turns on the series of light units to light the path if the photocells on the light units do not detect too much light. The person can now see where they are walking when it is dark, without having bright lights illuminate the entire room and blind the person or wake up a sleeping partner. Upon returning to bed, the person steps onto pressure switch 205 again and all of the light units extinguish.

Figure 3:
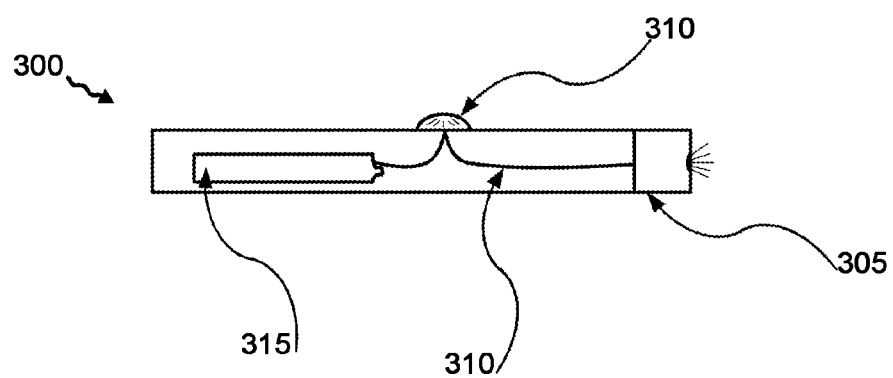
FIG. 3 illustrates an exemplary remote control to be used as a switch unit for an automatic low level lighting system, in accordance with an embodiment of the present invention.

FIG. 3 illustrates an exemplary remote control 300 to be used as a switch unit for an automatic low level lighting system, in accordance with an embodiment of the present invention. In the present embodiment, remote control 300 uses wireless communication waves infrared waves sent from a transmitter 305 to transmit a signal to a light unit or a series of light units. This is the same technology that is used in a remote control for a television. Remote control 300 comprises a button 310, which the user presses to send the signal from transmitter 305. In the present embodiment, remote control 300 is powered by a battery 315 that is connected to transmitter 305 by a wire 320. However, alternate embodiments may be powered by various different means including, without limitation, solar cells, being plugged into a wall outlet, etc.

In typical use of the present embodiment, when a situation arises where low level lighting is desired, a user presses button 310 on remote control 300 to transmit a signal to a light unit or a series of light units leading the person to a destination for example, without limitation, the bathroom, a children's room, an exit, etc. The signal turns on the light units to light the path if the photocells on the light units do not detect too much light. The user can now see where they are walking when it is dark, without having bright lights illuminate the entire room and blind the person or wake up a sleeping partner. When the user no longer desires the lighting, the user presses button 310 again to extinguish the light units.

Figure 4:
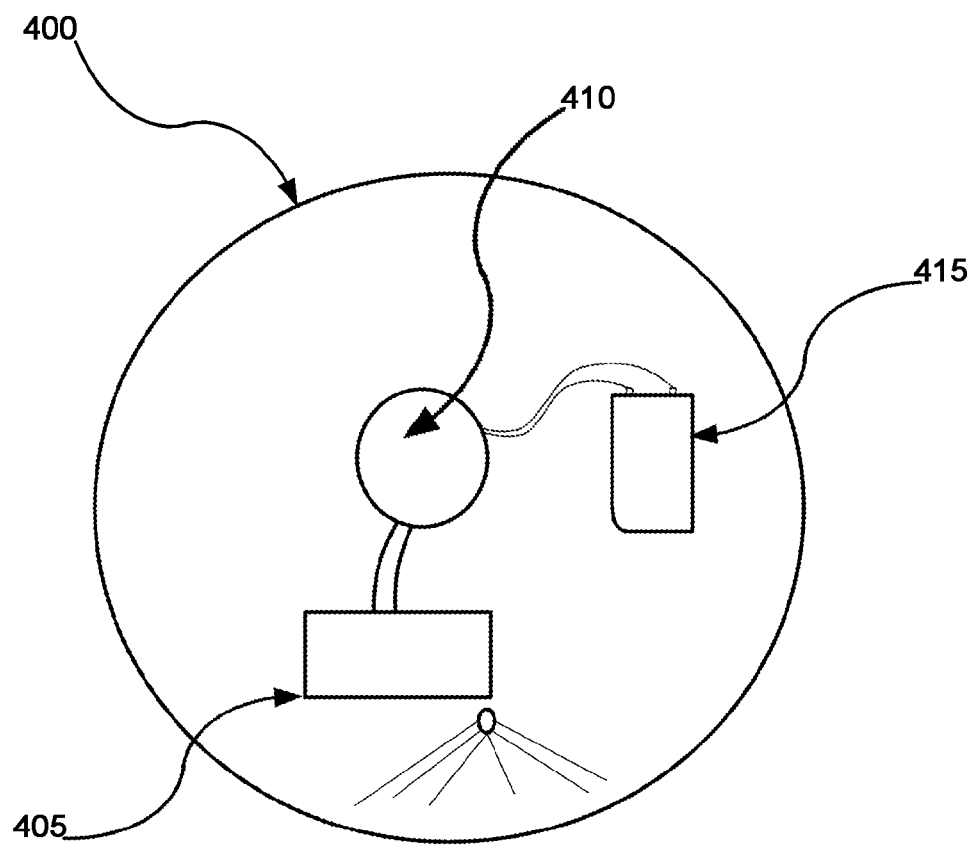
FIG. 4 illustrates an exemplary smoke detector to be used as a switch unit for an automatic low level lighting system, in accordance with an embodiment of the present invention.

FIG. 4 illustrates an exemplary smoke detector 400 to be used as a switch unit for an automatic low level lighting system, in accordance with an embodiment of the present invention. In the present embodiment, smoke detector 400 comprises a transmitter 405 that sends a signal of wireless communication waves infrared waves to a light unit or a series of light units. Transmitter 405 is connected to an alarm 410 and a battery 415. In typical use of the present embodiment, when smoke detector 400 senses the presence of smoke, alarm 410 is triggered and sends a signal to transmitter 405. Transmitter 405 then sends a signal to a light unit or a series of light units illuminating a path to an exit.

Alternate embodiments may use anything as a switch that can send a signal to the light units to turn on low level floor lights. For example, without limitation, the switch may be a pressure switch with a battery source for power, an electronic switch that is hard wired into the building, a motion switch that is either battery powered or hard wired allowing for new smart home technology, or a remote control with a battery source. The light units in preferred embodiments are plugged into existing outlets; however, the light units in alternate embodiments may be hard wired into walls, may run on battery power, or may run on solar power.

Exemplary applications of preferred embodiments of the present invention may include, without limitation, for nursing mothers, emergency egress out of a smoke filled building, for children who are being potty trained, and for people that have frequent urination problems at night. Nursing mothers could use preferred embodiments of the present invention at night when feeding their babies as to have soft lighting to see with that is not too bright to inhibit the babies to return to sleep. If a building is on fire, lights in a preferred embodiment could illuminate a path of escape to exit the building even when visibility is reduced, for example, without limitation, from smoke. Children that are being potty trained often wet the bed for fear of monsters hiding under their bed. Preferred embodiments enable the child to illuminate the floor showing a lighted path to the bathroom and confirming that there are no monsters hiding. People who need to urinate frequently during the night may use preferred embodiments of the present invention to help them navigate safely to the bathroom without injury and without disturbing their sleeping partner.

Having fully described at least one embodiment of the present invention, other equivalent or alternative methods of providing low level floor lighting according to the present invention will be apparent to those skilled in the art. The invention has been described above by way of illustration, and the specific embodiments disclosed are not intended to limit the invention to the particular forms disclosed. For example, the particular implementation of the switch unit may vary depending upon the particular type of signal used. The switches described in the foregoing were directed to infrared implementations; however, similar techniques are to hardwire the switch unit to the light units. Non-infrared implementations of the present invention are contemplated as within the scope of the present invention. The invention is thus to cover all modifications, equivalents, and alternatives falling within the spirit and scope of the following claims.

What is claimed is:

1. An automatic, low level floor lighting system comprising:
   a light unit comprising a light operable to produce visible light when energized by a power source, a connection to said power source, an ambient light sensor for inhibiting said light from being energized when an ambient light is above a predetermined level, a receiver for receiving an activation signal for energizing said light and a deactivation signal for de-energizing said light and a transmitter for transmitting said activation signal and said deactivation signal to an additional unit; and
   a remote activation unit for transmitting said activation signal and said deactivation signal to said receiver when said user engages said remote activation unit where said user can remotely turn said light on and off when said ambient light is below a predetermined level, wherein said remote activation unit comprises a pressure switch contained in a throw rug.

2. The system as recited in claim 1, further comprising a control means for allowing a user to adjust an intensity of said visible light.

3. The system as recited in claim 1, wherein said receiver, transmitter or remote activation unit, or any combination of said receiver, transmitter or remote activation unit, communicate using wireless communication waves.

4. The system as recited in claim 1, wherein said remote activation unit is also contained within a hand held device, wherein said hand held device comprises a button which said user engages.

5. The system as recited in claim 1, further comprising a plurality of light units where when at least one of said light units receives said activation signal from said remote activation unit, said activation signal is passed between said light units such that all of said light units receive said activation signal.

6. An automatic, low level floor lighting system comprising:
   a light unit comprising a light operable to produce visible light when energized by a power source, a connection to said power source, an ambient light sensor for inhibiting said light from being energized when an ambient light is above a predetermined level, a receiver for receiving an activation signal for energizing said light and a deactivation signal for de-energizing said light, a transmitter for transmitting said activation signal and said deactivation signal to an additional unit, and a flexible tube having a distal end joined to said light where, by bending said flexible tube, a direction of a beam of said visible light can be changed; and
   a remote activation unit for transmitting said activation signal and said deactivation signal to said receiver when said user engages said remote activation unit where said user can remotely turn said light on and off when said ambient light is below a predetermined level.

7. The system as recited in claim 6, wherein said light unit further comprises a shroud to illuminate a path on the floor and block visible light not directed to the floor.

8. The system as recited in claim 6, wherein said receiver, transmitter or remote activation unit, or any combination of said receiver, transmitter or remote activation unit, communicate using wireless communication waves.

9. An automatic, low level floor lighting system comprising:
   a light unit comprising a light operable to produce visible light when energized by a power source, a connection to said power source comprising prongs that fit a standard wall outlet, an ambient light sensor for inhibiting said light from being energized when an ambient light is above a predetermined level, a receiver for receiving an activation signal for energizing said light and a deactivation signal for de-energizing said light, and a transmitter for transmitting said activation signal and said deactivation signal to an additional light unit; and
   a remote activation unit for transmitting said activation signal and said deactivation signal to said receiver when said user engages said remote activation unit, wherein said user can remotely turn said light on and off when said ambient light is below a predetermined level.

10. An automatic, low level floor lighting system comprising:
    a light unit comprising a light operable to produce visible light when energized by a power source, a connection to said power source, an ambient light sensor for inhibiting said light from being energized when an ambient light is above a predetermined level, a receiver for receiving an activation signal for energizing said light and a deactivation signal for de-energizing said light, and a transmitter for transmitting said activation signal and said deactivation signal to an additional unit;
    a remote activation unit for transmitting said activation signal and said deactivation signal to said receiver when said user engages said remote activation unit, wherein said user can remotely turn said light on and off when said ambient light is below a predetermined level; and
    a smoke detector comprising an additional remote activation unit for transmitting said activation signal when said smoke detector issues an alarm.

11. An automatic, low level floor lighting system comprising:
    a light unit comprising means for producing visible light, means for changing a direction of a beam of said visible light, means for connecting to a power source, means for inhibiting said producing means when an ambient light is above a predetermined level, means for receiving an activation signal to activate said producing means and a deactivation signal for deactivating said producing means and means for transmitting said activation signal and said deactivation signal to an additional light unit; and a means for remotely transmitting said activation signal and said deactivation signal to said receiving means where said producing means can be turned on and off when said ambient light is below said predetermined level.

12. The system recited in claim 11, further comprising means for controlling an intensity of said beam of said visible light.

13. The system recited in claim 12, further comprising means for illuminating a path on the floor and means for blocking said visible light which is not directed at the floor.

14. An automatic, low level floor lighting system comprising:

a light unit comprising means for producing visible light, means for connecting to a power source, means for inhibiting said producing means when an ambient light is above a predetermined level, means for receiving an activation signal to activate said producing means and a deactivation signal for deactivating said producing means, means for transmitting said activation signal when smoke is detected, and means for transmitting said activation signal and said deactivation signal to an additional light unit; and a means for remotely transmitting said activation signal and said deactivation signal to said receiving means, wherein said producing means can be turned on and off when said ambient light is below said predetermined level.

15. An automatic, low level floor lighting system comprising:

a plurality of light units each comprising a light operable to produce visible light when energized by a power source, a connection to said power source, an ambient light sensor for inhibiting said light from being energized when an ambient light is above a predetermined level, a receiver for receiving an activation signal for energizing said light and a deactivation signal for de-energizing said light and a transmitter for transmitting said activation signal and said deactivation signal to at least one other light unit where said user can remotely send said activation signal and said deactivation signal to turn said light on and off in all of said plurality of light units when said ambient light is below a predetermined level, and wherein at least one of said light units further comprises a flexible tube having a distal end joined to said light where, by bending said flexible tube, a direction of a beam of said visible light can be changed.

16. The system as recited in claim 15, wherein said at least one of said light units further comprises a control means for allowing a user to adjust an intensity of said visible light.

17. The system as recited in claim 15, wherein said at least one of said light units further comprises a shroud to illuminate a path on the floor and to block said visible light which is not directed at the floor.

18. The system as recited in claim 15, wherein said receivers and transmitters, or any combination of said receivers and transmitters, communicate using wireless communication waves.

19. The system as recited in claim 15, wherein said connectors further comprises prongs that fit a standard wall outlet.

20. The system as recited in claim 15, further comprising a smoke detector comprising a remote activation unit for transmitting said activation signal when said smoke detector issues an alarm.

* * * * *